US006976706B2

(12) United States Patent
Smith et al.

(10) Patent No.: US 6,976,706 B2
(45) Date of Patent: Dec. 20, 2005

(54) INFLATABLE BOLSTER WITH DECORATIVE FRONT PANEL AND EXPANDABLE METAL REAR PANEL

(75) Inventors: Bradley W. Smith, Ogden, UT (US); Alan R. Larsen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 182 days.

(21) Appl. No.: 10/359,773

(22) Filed: Feb. 6, 2003

(65) Prior Publication Data

US 2004/0155447 A1 Aug. 12, 2004

(51) Int. Cl.[7] .................. B60R 21/045; B60R 21/22
(52) U.S. Cl. .............. 280/753; 280/751; 280/730.1; 280/732
(58) Field of Search ................ 280/753, 751, 280/730.1, 730.2, 732

(56) References Cited

U.S. PATENT DOCUMENTS

| | | | |
|---|---|---|---|
| 3,552,770 A | | 1/1971 | Berryman |
| 5,615,914 A | * | 4/1997 | Galbraith et al. ......... 280/743.1 |
| 5,752,717 A | * | 5/1998 | Galbraith et al. ......... 280/743.1 |
| 5,816,613 A | * | 10/1998 | Specht et al. ............... 280/753 |
| 5,839,756 A | * | 11/1998 | Schenck et al. .......... 280/743.1 |
| 6,032,978 A | * | 3/2000 | Spencer et al. ........... 280/730.1 |
| 6,170,871 B1 | | 1/2001 | Goestenkors et al. .... 280/743.1 |
| 6,213,497 B1 | * | 4/2001 | Spencer et al. ........... 280/730.1 |
| 6,213,506 B1 | | 4/2001 | Swann et al. ............... 280/751 |
| 6,345,838 B1 | | 2/2002 | Schneider ................ 280/730.1 |
| 6,431,600 B1 | * | 8/2002 | Freisler et al. .............. 280/751 |
| 6,619,689 B2 | * | 9/2003 | Spencer et al. .......... 280/730.1 |
| 6,688,643 B2 | * | 2/2004 | Schneider .................... 280/753 |
| 6,712,385 B2 | * | 3/2004 | Enders ..................... 280/730.1 |
| 6,758,493 B2 | * | 7/2004 | Conlee et al. ............... 280/753 |
| 6,848,715 B2 | * | 2/2005 | Nelson et al. ............... 280/753 |

FOREIGN PATENT DOCUMENTS

WO WO-00/50270 8/2000

OTHER PUBLICATIONS

Anonymous, "Inflatable Bellows-Box Panel," Research Disclosure, Kenneth Mason Publications, Hampshire, Great Britain, vol. 374, No. 9, Jun. 1995, pp. 1-2.
Anonymous, "Side Impact Protection Device," Research Disclosure, Kenneth Mason Publications, Hampshire, Great Britain, vol. 375, No. 13, Jul. 1995, pp. 1-2.

* cited by examiner

Primary Examiner—Paul N. Dickson
Assistant Examiner—George D. Spisich
(74) Attorney, Agent, or Firm—Sally J. Brown

(57) ABSTRACT

An inflatable bolster system is provided for supporting a body portion of a vehicle occupant such as the knees and lower body or pelvis during a collision. The inflatable bolster includes a decorative substantially rigid front panel and an expandable metal rear panel attached to the non-metal decorative front panel. The inflatable bolster has an inflation orifice, and may have at least one vertical expansion fold and at least one horizontal expansion fold on the rear panel.

45 Claims, 8 Drawing Sheets

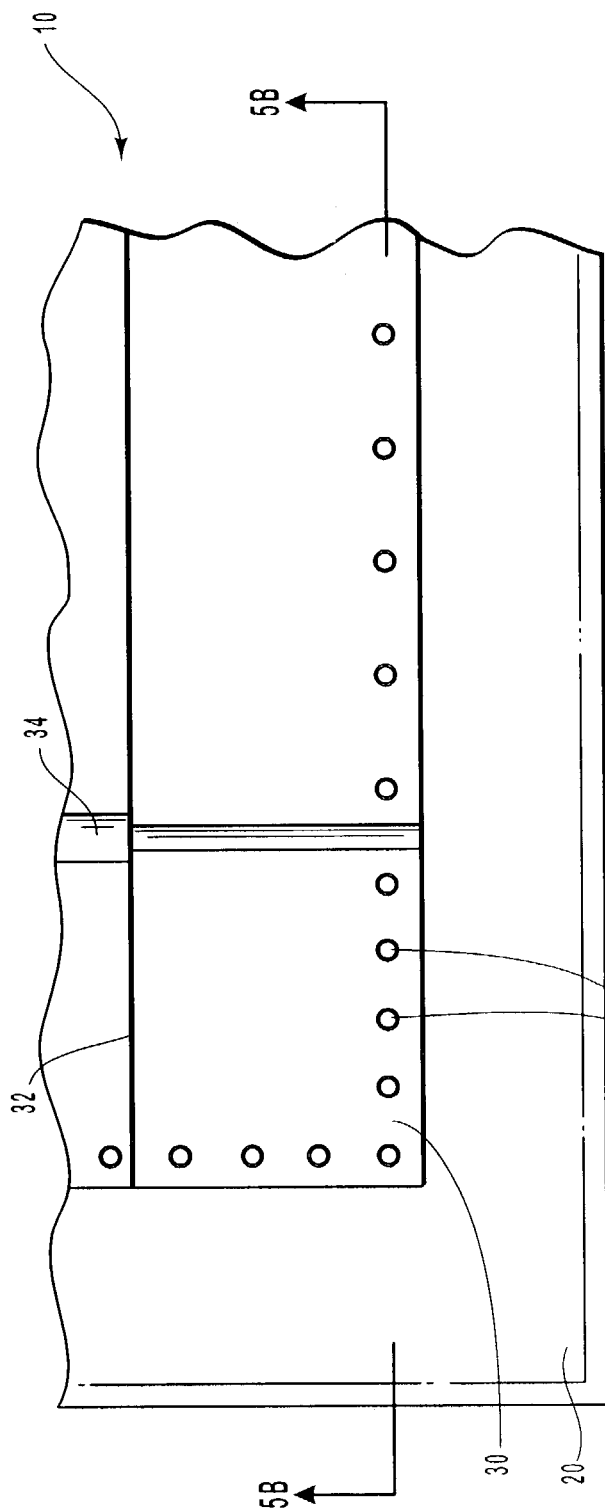
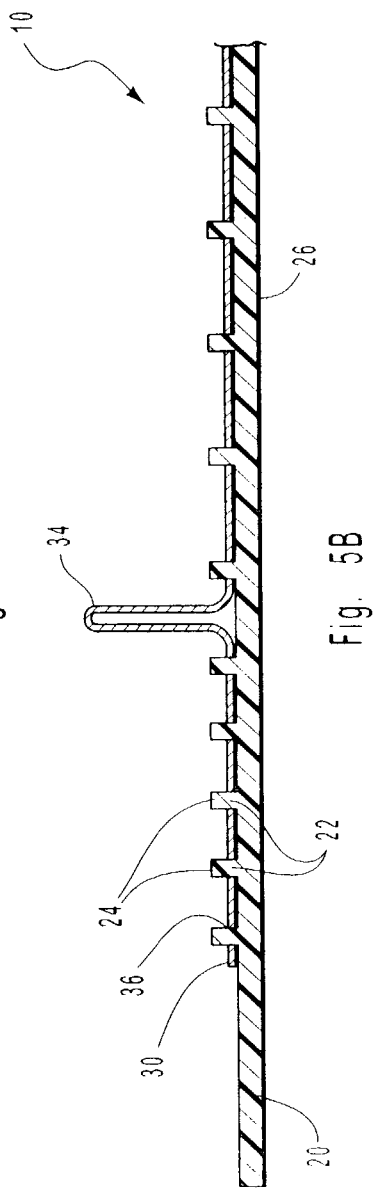
Fig. 5A
Fig. 5B

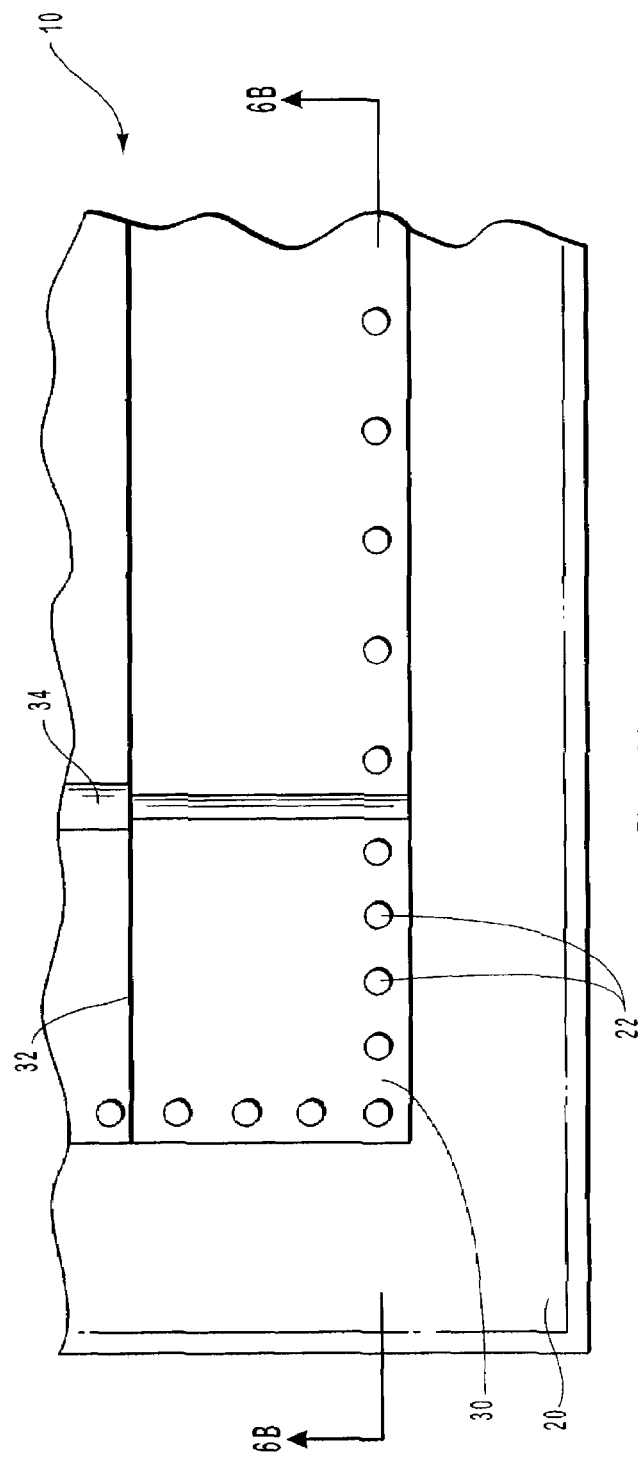
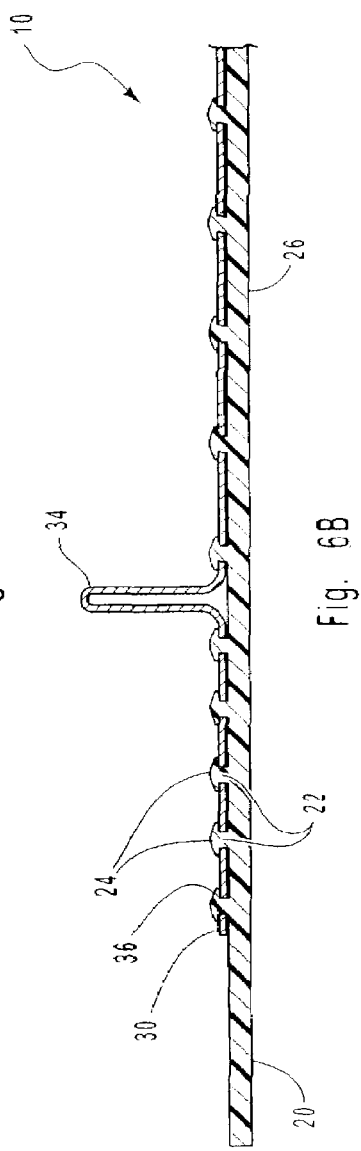
Fig. 6A
Fig. 6B

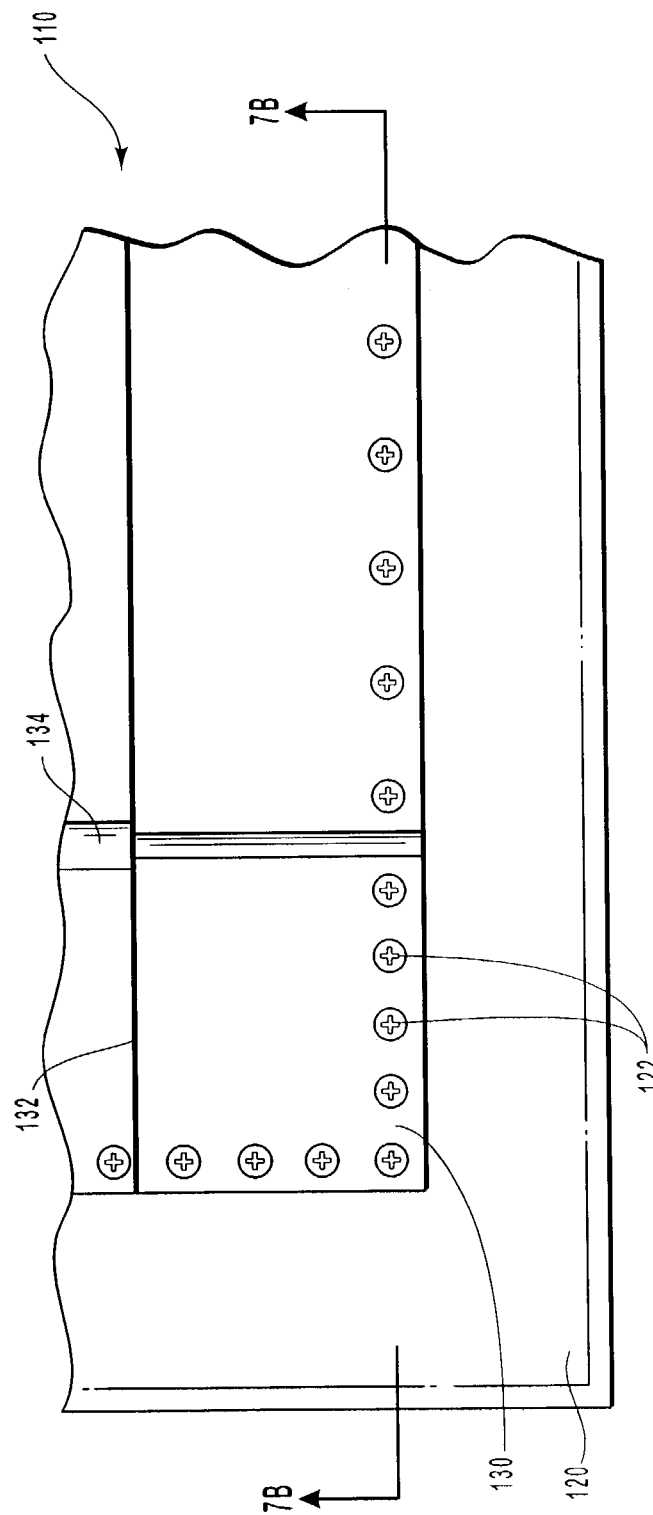
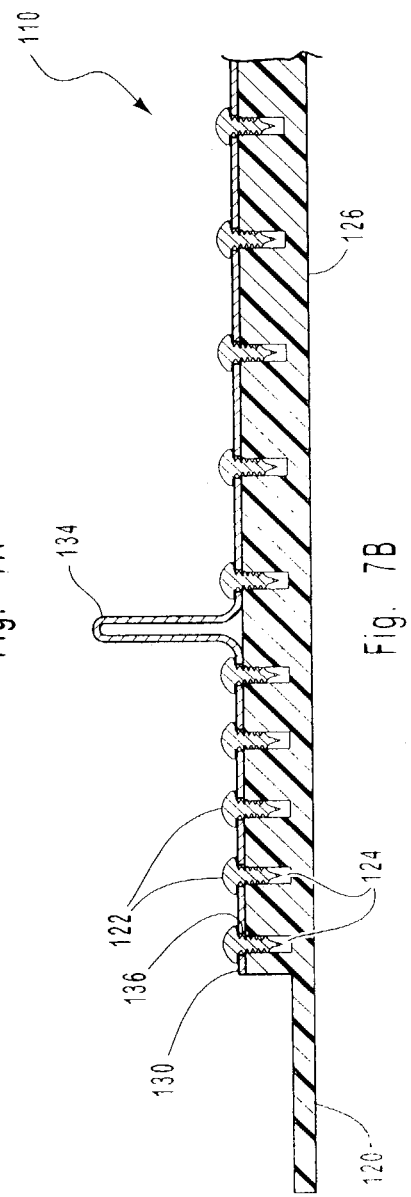
Fig. 7A
Fig. 7B

INFLATABLE BOLSTER WITH DECORATIVE FRONT PANEL AND EXPANDABLE METAL REAR PANEL

BACKGROUND OF THE INVENTION

1. Field of the Invention

The present invention relates to inflatable bolsters used in vehicles. More specifically, the present invention relates to an inflatable bolster system for restraining a vehicle occupant during a collision.

2. Description of Related Art

Inflatable airbags enjoy widespread acceptance as passive passenger restraints for use in motor vehicles. This acceptance has come as airbags have built a reputation of preventing death and injury over years of use. Studies show that in some instances, the use of frontally-placed vehicular airbags can reduce the number of fatalities in head-on collisions by 25% among drivers using seat belts and by more than 30% among unbelted drivers. Other statistics suggest that in a frontal collision, the combination of a seat belt and an airbag can reduce the incidence of serious chest injuries by 65% and the incidence of serious head injuries by up to 75%. These numbers and the thousands of prevented injuries they represent demonstrate the life-saving potential of airbags and the need to encourage their use, production, and development.

Airbags are generally linked to a control system within the vehicle that triggers their initiation when a collision occurs. Generally, an accelerometer within the vehicle measures the abnormal deceleration caused by the collision event and triggers the ignition of an airbag inflator. This control system is often referred to as an electronic control unit (or "ECU"). The ECU includes a sensor that continuously monitors the acceleration and deceleration of the vehicle and sends this information to a processor which uses an algorithm to determine whether a deceleration experienced by the vehicle is a collision or not. Additional sensors may be linked to the ECU to allow the proper detection of side-impact collisions, rollovers, etc.

When the processor of the ECU determines, based on a set of pre-determined criteria, that the vehicle is experiencing a collision, the ECU transmits an electrical current to an initiator assembly connected to an inflator that is coupled to the airbag module. The initiator activates the inflator. An inflator is a gas generator that typically uses a compressed or liquefied gas or mixture of gases, a solid fuel, or some combination of the above to rapidly generate a volume of inflation gas. The gas inflates the airbag, which deploys into the path of the vehicle occupant and absorbs the impact of the vehicle occupant.

As experience with the manufacture and use of airbags has progressed, the engineering challenges involved in their design, construction, and use have become better understood. First, most airbag systems are designed to rapidly inflate and provide a cushion in front of or near an occupant based on a presumption that the occupant will be in a predetermined position. Problems have been noted to occur when the occupant is "out of position" with regard to this presumed placement. Similarly, problems may occur when the occupant, though possibly at first in the predicted position, strikes a glancing blow to the airbag, and is then deflected off of the airbag before proper deceleration can occur.

Out of position injuries may be attributed in part to the fact that most airbag systems have been primarily designed for deployment in front of the torso of an occupant. More specifically, such airbags are disposed for deployment between the upper torso of an occupant and the windshield and instrument panel. During a front-end collision, there is a tendency for an occupant, particularly one who is not properly restrained by a seat belt, to slide forward across the seat. In some cases, the vehicle occupant may "submarine," or slide off of the front of the seat and under the primary frontal airbag during impact. This may compromise the ability of the primary airbag to provide proper protection to the occupant.

In order to avoid danger of injury to occupants as a result of such poor positioning, knee bolster airbag systems have been developed. These airbags deploy during a collision event and engage an occupant's knees or lower legs. This holds the occupant in place on the seat, and improves the kinematics of the occupant.

Such knee bolster airbag systems, like many other airbag systems, often suffer from high cost and from engineering problems. Specifically, knee bolster airbags are difficult to design to be mounted in the tight spaces available under the steering column or dashboard in order to be properly positioned to contact a vehicle occupant's knees. Additionally, the airbags themselves must be treated with various coatings to protect the fabric of the airbag from the heat of the gas. Finally, in some specific applications, fabric airbags have proven very difficult to install.

In other types of collisions, airbags are positioned at the side of a vehicle occupant to cushion impacts with a lateral surface such as a door or other interior panel. These generally take the form of side-curtain airbags and side-positioned airbags designed to protect the head, torso, pelvis, or any combination of these and other body regions. These airbags must be designed to provide adequate support under high load conditions. Further, such airbags pose design difficulties because of the need to mount them such that they can easily deploy into the often narrow space between a vehicle occupant and the door or side panel of a vehicle.

Thus, it would be an advancement in the art to provide an inflatable bolster system to protect a vehicle occupant during collision events in a wide variety of situations. Specifically, it would be an advancement in the art to provide an inflatable bolster suitable for mounting in a vehicle under the steering column or dashboard; or in a door, side panel, or trim panel. It would also be an advancement in the art to provide an inflatable bolster including both metal and non-metal components. Additionally, it would be an advancement in the art to provide an airbag system using heat-damage-resistant components to allow the use of lower-cost pyrotechnic inflators. It would also be an advancement in the art to provide an inflatable bolster device using fewer components than the bolsters currently available. It would be a further advancement in the art to provide an inflatable bolster in which the bolster portion of may be configured to function as a decorative trim panel for the interior of a vehicle.

Such a device is disclosed and claimed herein.

SUMMARY OF THE INVENTION

The apparatus of the present invention has been developed in response to the present state of the art, and in particular, in response to the problems and needs in the art that have not yet been fully solved by currently available inflatable bolsters, including knee bolsters and pelvic bolsters. In accordance with the invention as embodied and broadly described herein in the preferred embodiment, a hybrid metal/non-metal inflatable bolster system for supporting the knees, lower body, pelvis, and/or torso of a vehicle occupant during a collision is provided.

The invention thus provides inflatable bolsters for supporting a vehicle occupant during a collision event. Specifically, the invention provides hybrid metal/non-metal inflatable bolsters configured to be installed in a vehicle such that when deployed, they expand into the path through a body part would likely travel during a collision event. Such positions may include locations under the dashboard of a vehicle, in glove box doors, in vehicle doors and side panels, and in other trim panels. As such, the hybrid metal/non-metal bolsters of the invention may be suitable for use as inflatable knee bolsters and as inflatable pelvic bolsters.

The inflatable bolsters of the invention generally include a substantially rigid nonmetal front panel attached to an expandable metal rear panel. The rigid nonmetal front panel of the inflatable bolster is configured to be used as an interior trim panel of a vehicle, and to contact the knees and/or lower legs, pelvis, or other body region of a vehicle occupant. In order to facilitate decorative use, the nonmetal front panel may be shaped to conform to the contours of the interior of the vehicle. Further, the front panel may be colored, grained, and textured to have an appearance suitable for use in the interior of a vehicle. The shape of the front panel may also be tuned for use as a bolster. This function may require specific geometries to render it suitable for contact with the knees, pelvis, or other body parts of a vehicle occupant. The specific function of the inflatable bolster may further dictate the specific materials from which it may be constructed.

The rear panel of the inflatable bolster generally includes an expandable metal panel having expansion folds which unfurl when the bolster is inflated. The panel is rendered expandable by the expansion folds positioned along at least one edge of the rear panel. These expansion folds provide the extra material needed for expansion. The rear panel may include both expansion folds which travel along a vertical axis of the rear panel and expansion folds which travel along a horizontal axis of the rear panel. Since the expandable metal rear panel is generally parallelogrammatic in shape, expansion folds are generally present in pairs, with matching folds being present on opposite parallel sides of the panel. These paired folds are generally equivalent in size and orientation to each other. Thus, the inflatable bolster deploys substantially perpendicularly from its original placement in a vehicle. In some applications, it may be desirable to cause the bolster to deploy at an angle to its original placement. This may be done by providing asymmetrical pairs of folds to permit one side of the bolster to expand further than another side, rotating the panel.

The expansion folds may be tuned in size, number, and shape to control the distance the inflatable bolster travels when deployed. Specifically, the number or size of pairs of folds may be increased to increase the deployment distance of the rigid front panel from its original placement. Additionally, the expansion folds may be adjusted in orientation and/or shape to control the deployed position of the bolster relative to the dashboard and relative to its original mounted position. This also dictates the final size of the inflated rear panel. When parallel folds are similar in size, the inflatable bolster deploys substantially perpendicularly to its original placement.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to be limiting of its scope. As a result, the invention will be described and explained with additional specificity and detail through the use of the accompanying drawings in which:

FIG. 5A is a partial rear plan view of an inflatable bolster of the invention;

FIG. 5B is a partial cross-sectional view of the inflatable bolster of FIG. 5A, taken at line 5B—5B of FIG. 5A;

FIG. 6A is a partial rear plan view of an inflatable bolster of the invention;

FIG. 6B is a partial cross-sectional view of the inflatable bolster of FIG. 6A, taken at line 6B—6B of FIG. 6A;

FIG. 7A is a partial rear plan view of an inflatable bolster of the invention;

FIG. 7B is a partial cross-sectional view of the inflatable bolster of FIG. 7A, taken at line 7B—7B.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the apparatus of the present invention, as represented in FIGS. 1 through 8, is not intended to limit the scope of the invention, as claimed, but is merely representative of presently preferred embodiments of the invention.

Figure 1:
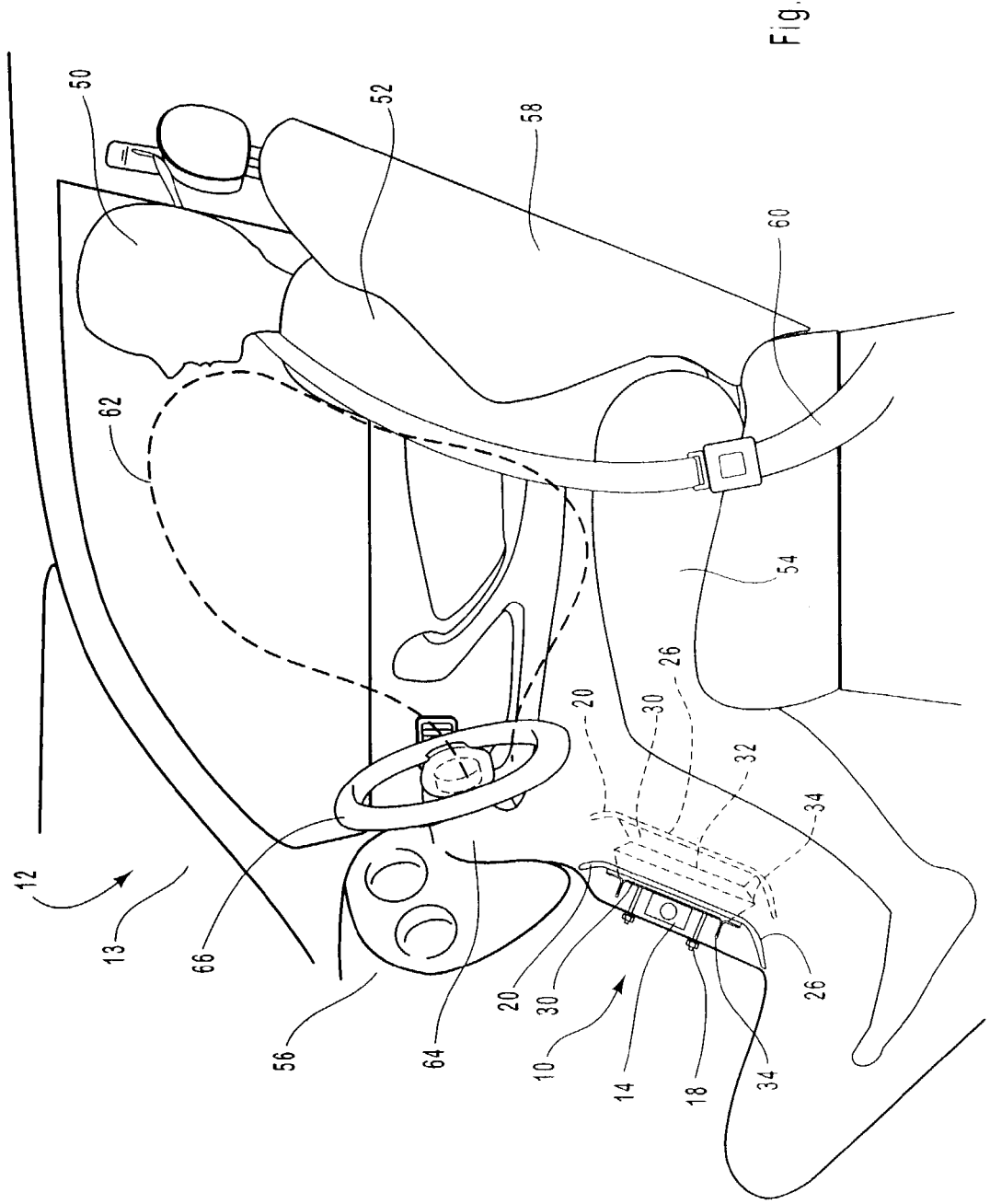
FIG. 1 is a side cutaway view of a vehicle including an inflatable bolster of the invention used as a knee bolster shown mounted and inflated.

In FIG. 1, a vehicle occupant 50 having an upper body portion 52 and a lower body portion 54 is shown seated in a front seat 58 of a vehicle 12. The front seat 58 faces an instrument panel 56 and a windshield 13. A steering column 64 projects from the instrument panel 56 to support a steering wheel 66. A primary airbag 62 is housed within the steering wheel 66. In FIG. 1, the primary airbag 62 is shown deployed in phantom.

An inflatable hybrid metal/non-metal bolster 10 is shown mounted below the steering column 64 for use as a knee bolster. Specifically, the hybrid bolster 10 is mounted in a position such that the substantially rigid front panel 20 of the bolster 10 is flush with other vehicle trim panels abutting it. When the hybrid bolster 10 is activated, the rigid front panel 20 is deployed outwardly to support the lower body portion 54 of the vehicle occupant 50. This helps to retain the vehicle occupant 50 in a position that facilitates optimal deceleration of the vehicle occupant by the primary airbag 62 and the seatbelt 60.

The inflatable hybrid bolster 10 may be installed as a trim panel in a vehicle 12. Specifically, the bolster 10 is suited for installation below the instrument panel 56 of a vehicle 12 such that it is positioned to deploy toward the vehicle occupant 50 into a projected path of travel of the occupant's lower body portion 54. Thus, the hybrid bolster 10 may be installed below a steering column 64 of a vehicle 12 in the driver's side of the vehicle 12, and below the instrument panel 56 in the passenger's side of the vehicle 12. In the passenger's side of a vehicle 12, it is also possible to mount such an inflatable bolster 10 into a glove box door (not shown). In such glove box door applications, sensors may be used to detect whether or not the door is closed prior to deployment to prevent improper deployment of the bolster 10. The inflatable bolster 10 of the invention may also be suitable for use in other positions in a vehicle 12, including in doors and other side panels of the vehicle 12 to provide support to a vehicle occupant 50 during a collision event.

As illustrated in FIG. 1, the inflatable hybrid bolster 10 includes a rigid front panel 20 and an expandable metal rear panel 30. This rigid panel 20 is generally the portion of the bolster 10 intended to contact the lower body portion 54 of the vehicle occupant 50. It may also be constructed of materials and of a fashion suitable for use as an interior panel of a vehicle 12. As such, the rigid front panel 20 may be decorative in nature on its outer face 26. Specifically, the outer decorative face 26 of the rigid front panel 20 may be contoured, grained, and colored to provide a pleasing appearance when used in the interior of a vehicle 12. These visual properties may be most easily varied in those embodiments of the invention using rigid front panels 20 made of substances such as plastic which may be molded, colored, and textured using techniques known in the art.

Additionally, as shown in FIG. 1, the rigid front panel 20 may be constructed having contours to match those of the interior of a vehicle 12 and to enhance the function of the front panel 20 as a component of the bolster 10. In some instances, the contours and shape of the front panel 20 may be dictated by the intended function of the inflatable hybrid bolster 10. Such intended functions include, but are not limited to uses as a knee bolster, a pelvic bolster, or an inflatable bolster for another body part.

FIG. 1 also shows the inflatable hybrid bolster 10 in phantom in its inflated configuration. The expandable metal rear panel 30 of the inflatable bolster 10 is configured to inflate upon introduction of a pressurized fluid between the panels 20, 30 of the bolster 10. The expandable metal rear panel 30 is generally parallelogrammatic in shape. Generally, the rear panel 30 includes expansion folds such as horizontal expansion fold 32 and vertical expansion fold 34, shown deployed in phantom.

These folds 32, 34 unfold during deployment of the bolster 10, driving the rigid front panel 20 outward from its installed position to place the face 26 in the path of a portion of the vehicle occupant 50 such as the lower body 54 or pelvis. The horizontal expansion folds 32 travel generally parallel to a horizontal axis of the rear panel 30. Similarly, the vertical expansion folds 34 travel along a vertical axis of the rear panel 30. The expansion folds 32, 34 are generally used in pairs, with paired folds being present on opposite sides of the panel 30. These paired expansion folds 32, 34 are generally substantially identical in size and number. This may configure the inflatable hybrid bolster 10 to be deployed substantially perpendicularly from its original placement in a vehicle 12. In alternative embodiments, the paired expansion folds 32, 34 may be independently varied in size, number, and shape to affect the manner in which the rigid front panel 20 is deployed. Such variations may be used to deploy the rigid front panel 20 along a curved or angled pathway.

Figure 2:
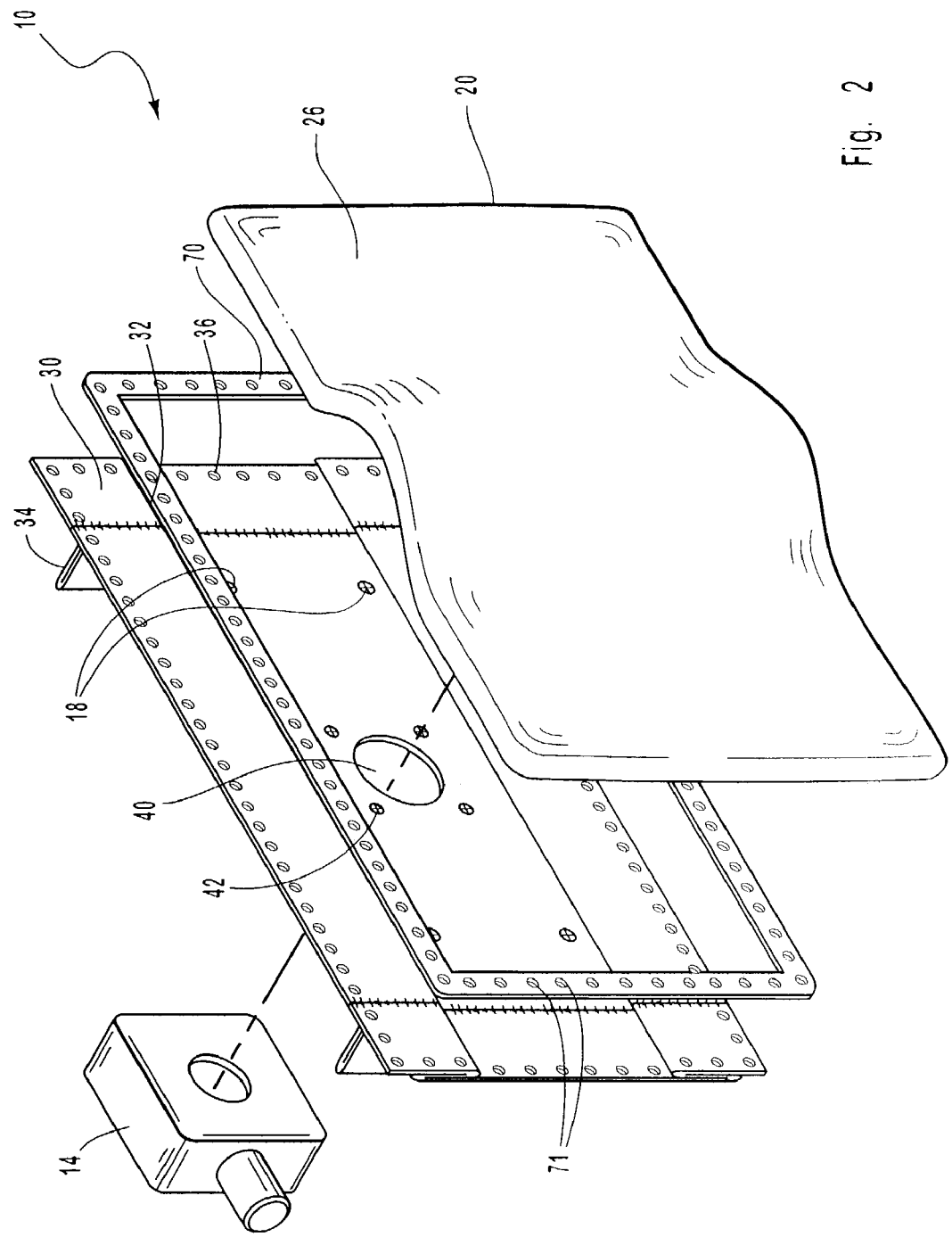
FIG. 2 is an exploded, perspective view of an inflatable bolster of the invention shown isolated.

Referring now to FIG. 2, an exploded, isolated perspective view of an inflatable hybrid bolster 10 of the invention is shown. FIG. 2 shows the relationship of the rigid front panel 20, the expandable metal rear panel 30, and the airbag inflator 14 to each other. First, the hybrid bolster 10 includes a front panel 20 composed of a substantially rigid material with a front surface 26 which may be used as an interior surface of a vehicle 12. As such, the front surface 26 may be constructed of a material that may be colored, textured, and molded to provide a decorative surface suitable for use in the cabin of a vehicle 12. The front surface 26 may be integral to the front panel 20 and made of the same material as the front panel 20. Alternatively, it may be a separate component attached to the front panel 20.

The inflatable hybrid bolster 10 next includes an expandable metal rear panel 30 that is attached to the rigid front panel 20. The expandable metal rear panel 30 has paired horizontal expansion folds 32 and paired vertical expansion folds 34 which are configured to expand during deployment to displace the rigid front panel 20 from its original mounted position.

The rear panel 30 may include an inflation orifice 40 through which an inflation fluid may be routed to inflate the bolster 10. The rear panel 30 may further include inflator attachments 42 for securing an inflator 14 to the bolster 10. Additionally, the rear panel 30 may include bolster attachments 18 for attaching the bolster 10 securely to the vehicle 12. The rear panel may also include a plurality of fastener ports 36 for attaching the front panel 20 of the bolster 10 to the rear panel 30. In some embodiments of the inflatable bolster 10, fasteners (not shown) pass from the front panel 20 through the fastener ports 36 of the rear panel 30 to hold the panels 20, 30 together.

In some embodiments of the bolster 10, the joint of the rigid front panel 20 and the expandable metal rear panel 30 may include a joint seal 70, as shown in FIG. 2. This joint seal 70 may be a compound or structure positioned at the joint of the panels 20. 30 to enhance the joint and help to prevent escape of inflation gas. In some configurations, the joint seal 70 takes the form of a foam seal positioned between the panels 20, 30. In other configurations, the joint seal 70 may be placed about the outside or inside of the bolster 10, and thus about the outside or inside surface of the joint. In some configurations, the joint seal includes holes 71 to permit passage of the fasteners 22 through the seals 70.

Suitable seals 70 which form a seal by being tightly pressed between the panels could be constructed out of materials such as foam, rubber, and elastomeric compounds. Other suitable seals 70 include structures which affix to both panels 20, 30 to produce a seal. These include structures such as a double-sided adhesive structure which adheres to the panels 20, 30, thus producing a seal and aiding in retaining inflation gas when the bolster 10 is deployed.

Figure 3:
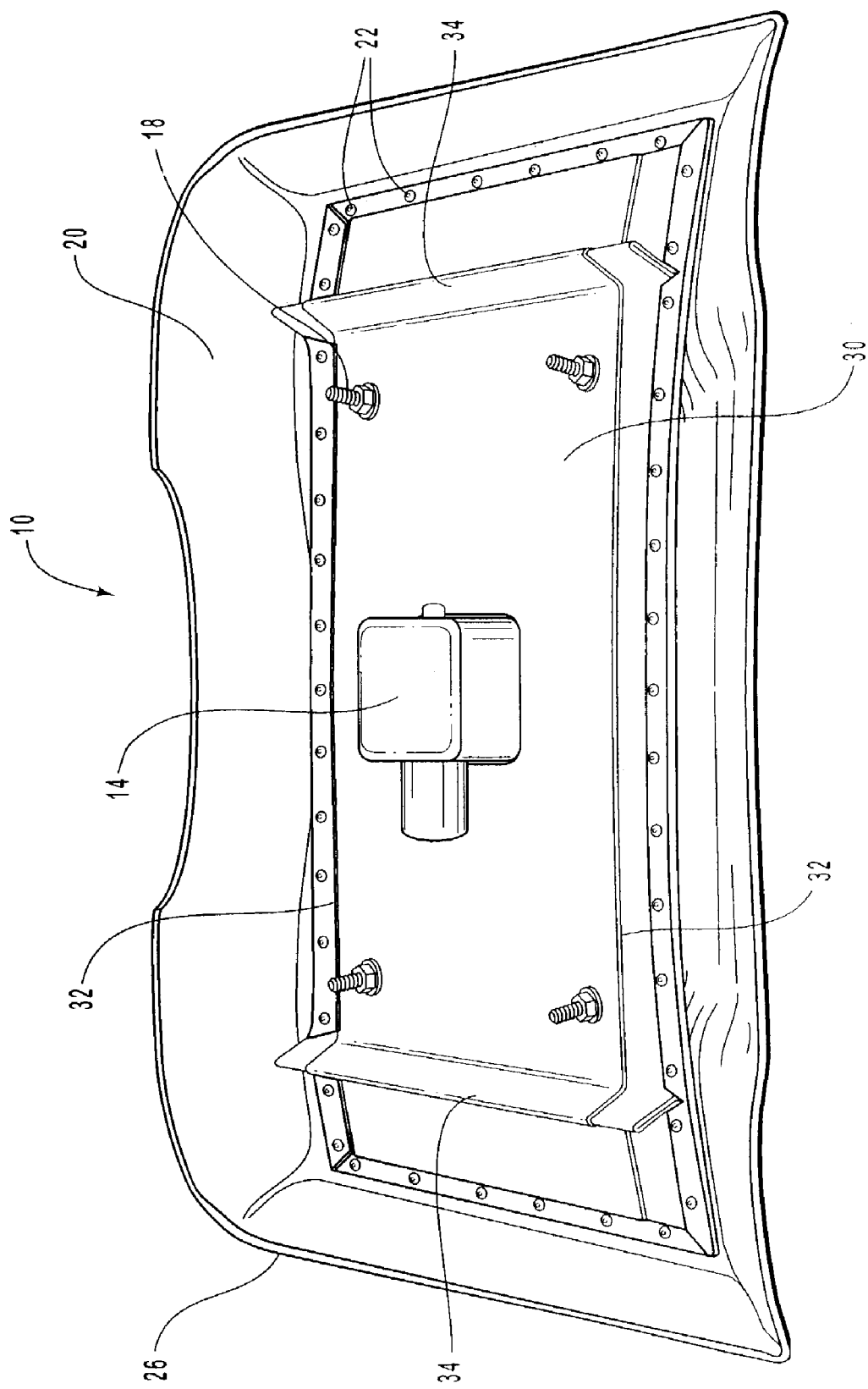
FIG. 3 is a rear perspective view of an inflatable bolster of the invention shown isolated in its compact configuration.

Referring now to FIG. 3, an isolated perspective view of an inflatable hybrid bolster 10 of the invention is shown. In this figure, the bolster 10 is shown from the rear to demonstrate the relationship between the two panels of the bolster 10. As above, the bolster 10 first includes a rigid front panel 20 for contacting a lower body portion 54 including at least the knees and/or legs or pelvis of a vehicle occupant 50 during a collision event. This front panel 20 is attached to an expandable rear panel 30 by fasteners 22. The hybrid bolster 10 may then be attached to a vehicle 12 using brackets or bolts such as attachments 18, or by other means known in the art that are secured to the expandable rear panel 30. These attachments 18 securely anchor the bolster 10 to the vehicle 12. This mounting makes the vehicle 12 a stable, rigid base for the deployment of the bolster 10.

In this embodiment of the inflatable hybrid bolster 10, the expandable rear panel 30 includes expansion folds such as horizontal expansion folds 32 and vertical expansion folds 34. The expansion folds 32, 34 unfurl when a pressurized fluid is released into the interior of the bolster 10. The size of the folds 32, 34 of the rear panel 30 regulates the size of the inflated expandable rear panel 30, and thus the distance that the rigid font panel 20 is displaced from its mounted position in the vehicle 12 when deployed. Thus, larger folds 32, 34 may be used if the rigid front panel 20 needs to be placed distant to its mounted position when deployed; and smaller folds 32, 34 may be used if the deployed rigid panel 20 needs to be placed only a small distance from its place of mounting when deployed.

The number and size of these expansion folds may also be varied to change the deployment path of the inflatable hybrid bolster 10. Specifically, in some versions or the bolster 10 of the invention, it may be desirable to deploy the rigid front panel 20 through an arcuate path, effectively rotating the rigid front panel 20 about an axis during deployment. This may be accomplished by providing asymmetrical sets of folds 32, 34. This might include sets in which the folds 32, 34 positioned on one side of the inflatable bolster 10 are sized differently from the folds 32, 34 opposite them. Additionally, the folds themselves may be angled. These changes could provide a deployed bolster 10 in which the relationship of the front panel 20 to the body portion (not shown) of a vehicle occupant (not shown) is different when deployed than when stowed. This may allow the inflatable hybrid bolster 10 to be customized to optimize the support it gives to a vehicle occupant (not shown) despite a less-than-optimal mounting angle in the vehicle 12.

As briefly mentioned above, the expandable metal rear panel 30 of the hybrid inflatable bolster 10 is attached to the rigid front panel 20 using fasteners 22. In those embodiments of the bolster 10 in which the rigid front panel 20 has a decorative front surface 26 for use as an interior panel of a vehicle 12, it is generally desirable that the fasteners 22 not project through the decorative front surface 26 of the rigid front panel 20. As a result, the fasteners 22 often take the form of projections from the rear face of the front panel 20 that extend through ports (not shown) in the rear panel 30.

These projections become fasteners 22 by passing them through the expandable metal rear panel 30 and then securing them in place using a variety of methods. In some variations of the inflatable hybrid bolster 10, the projections from the rigid front panel 10 which form the fasteners 22 are made of a nonmetal material that can be melted. These fasteners 22 may be secured by exposing them to heat, ultrasound, or other conditions which cause melting to deform the portion of the fastener 22 extending out of the expandable metal rear panel 30 to secure it in place. The fastener tip may be deformed to have a mushroom-shaped tip to extend the interface of the fastener 22 and the panel 30 over a wider surface area. Alternatively, such fasteners 22 could be configured to be secured in place using methods known in the art such as bolting them in place, or configuring them to snap into place after passing them through the expandable metal real panel 30.

In some alternative inflatable hybrid bolsters of the invention, fasteners 22 may be passed through the expandable metal rear panel 30 into the rigid front panel 20. In such bolsters, in order to preserve the appearance of the decorative front panel 20, the fasteners 22 generally extend only partially into the front panel 20. To provide a stronger attachment, the rigid front panel 20 may be thickened to allow the fasteners 22 to enter more deeply.

Figure 4:
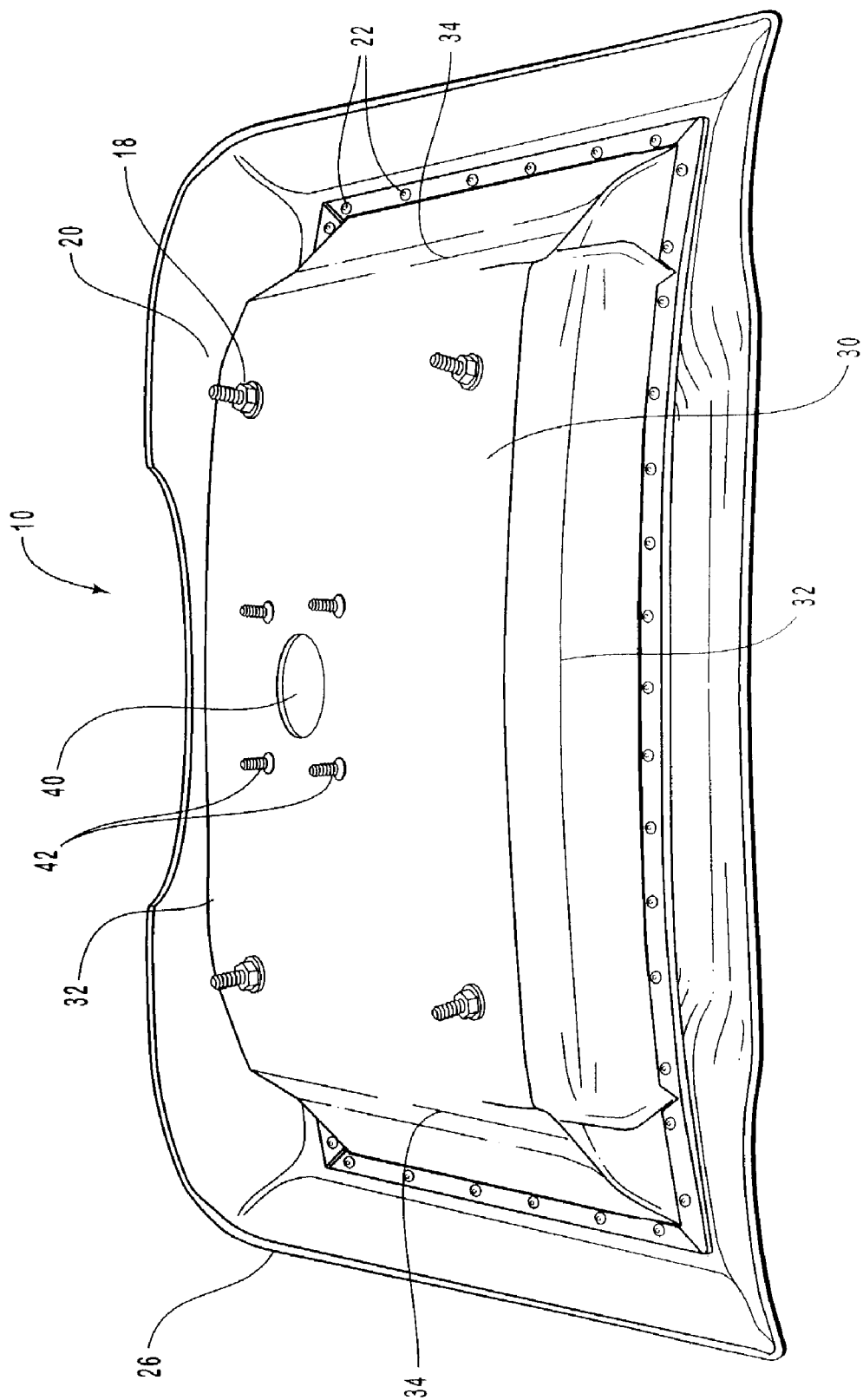
FIG. 4 is a rear perspective view of the inflatable bolster of FIG. 2 shown isolated in its inflated configuration.

Referring now to FIG. 4, the inflatable hybrid bolster 10 of FIG. 3 is shown from the rear in its deployed, or inflated, configuration. Here, as above, the inflatable bolster 10 includes a rigid front panel 20 attached to an expandable metal rear panel 30 by fasteners 22. The expandable rear panel 30 is shown expanded, having been inflated by introducing a pressurized inflation fluid into an inflation inlet 40 through an inflator (not shown) held to the bolster 10 by attachments 42.

Expansion folds 32 and 34 provide the expansion of the expandable metal rear panel 30. Specifically, the expansion folds 32 and 34 unfurl as shown in FIG. 4 in response to the introduction of the pressurized fluid into the bolster 10 through the inflation inlet 40. Here, the horizontal expansion folds 32 and the vertical expansion folds 34 are shown unfolded, resulting in the expansion of the rear panel 30. The rear panel 30 is held to the front panel 20 by a series of fasteners 22 such that during the unfolding of the expansion folds 32, 34, the rear panel 30 is held securely to the rigid panel 20. The number and spacing of such fasteners 22 may be varied within the scope of the invention.

In the version of the bolster shown in FIG. 4, the expandable rear panel 30 includes symmetrical pairs of horizontal expansion folds 32 and vertical expansion folds 34. This configuration results in the deployment of the rigid front panel 20 directly forward from its point of installation. As briefly discussed above, the size and number of these expansion folds 32, 34 may be varied to control the expansion distance and expansion path of the inflatable hybrid metal/non-metal bolster 10 of the invention. For example, if it is desired to provide a longer expansion distance for the bolster 10, expansion folds 32, 34 may be enlarged to allow for broader expansion of the inflatable bolster 10. Alternatively, if the folds have a selected size, the number of the folds may be increased to achieve a similar result.

The expandable metal rear panel 30 of the inflatable hybrid bolster 10 is here shown to be configured to be attached directly to an inflator (not shown). This may include the incorporation of an inflation orifice 40 into the rear panel 30, as well as the use of attachments 42 to hold the inflator 14 to the panel. In the inflatable bolster 10 shown in FIG. 3, the inflator 14 is attached to the bolster 10 about the inflation orifice 40 shown in FIG. 4. In this manner, the inflator 14 may provide a charge of an inflation fluid directly to the inflatable hybrid bolster 10 without the use of gas guides and additional connectors.

Referring again to FIG. 4, the bolster 10 may be installed in a vehicle (not shown) by mounting it to the vehicle at the expandable metal rear panel 30. It is generally mounted using attachments such as 18 such that the rigid front panel 20 is flush with the other internal trim panels of the vehicle. When the inflatable bolster 10 is deployed, thus displacing the front panel 20 from its installed position, the bolster 10 is retained to the vehicle by the attachments 18 made to the rear panel 30.

FIGS. 5A through 7B show several attachment schemes useful in the scope of the invention in attaching the rigid front panel 20 to the expandable metal rear panel 30. In these attachment schemes, various types of fasteners 22 may be used. The use of some types of fasteners 22 may require changes to the configuration of either or both the front panel 20 and the rear panel 30.

First referring to FIG. 5A, a partial rear plan view of the inflatable hybrid bolster 10 of the invention is shown. In this Figure, the bolster 10 is shown during assembly with the fasteners 22 only partially formed. The inflatable hybrid bolster 10 may be assembled using fasteners 22 foried integrally to one of the two panels of the bolster 10. In the version shown in FIGS. 5A and 5B, the rigid front panel 20 is formed to include fasteners 22. These fasteners 22 are simply projections from the rigid front panel 20 which extend from the front panel 20 through ports 36 in the expandable metal rear panel 30. During assembly of the inflatable hybrid bolster 10, the fasteners 22 are placed through the ports 36 such that they at least partially project through the rear panel 30.

FIG. 5A further shows the relationship of the expansion folds of the bolster 10. Specifically, a portion of the bolster 10 is shown to include a horizontal expansion fold 32 and a vertical expansion fold 34. Here, the folds 32, 34 overlap each other approximately perpendicularly. Thus, in manufacturing the rear panel 30 of this version of the inflatable hybrid bolster 10, the horizontal expansion fold 32 is made first, and then subsequently overlapped by the vertical expansion fold 34. In other inflatable bolsters 10 of the invention, the order of the folding, and thus the orientation of the overlap, may be varied.

FIG. 5B shows a cross-sectional view of the inflatable bolster 10 taken at line 5B—5B of FIG. 5A. As in FIG. 5A, FIG. 5B shows an inflatable bolster 10 during assembly with the fasteners 22 only partially formed. In this view, the tips 24 of the fasteners 22 are easily seen to extend from the rigid front panel 20 through the expandable metal rear panel 30. As illustrated, the fastener tips 24 project from the rigid front panel 20 through ports 36 of the rear panel 30. This aligns the front panel 20 and the rear panel 30 and closely associates them in preparation for securing the panels together.

FIG. 5B further shows the configuration of the expandable rear panel 30. Specifically, the expandable rear panel 30 is shown to include a vertical expansion fold 34. The fold 34 is anchored on both sides to the rigid front panel 20 at the periphery of the expandable panel 30. The fasteners 22 hold the periphery of the expandable rear panel 30 securely to the rigid front panel 20 while allowing the expandable rear panel 30) to inflate in its center region.

FIGS. 6A and 6B show the inflatable hybrid bolster of FIGS. 5A and 5B after the fasteners 22 have been fully formed, securing the panels 20, 30 together. FIG. 6A shows a partial rear plan view of the inflatable bolster 10. In FIG. 6A, as noted above, the fasteners 22 are shown completely formed. Specifically, the tips 24 of the fasteners 22 projecting through ports 36 of the expandable metal rear panel 30 are shown deformed from their original configuration. The fastener tips 24 have been partially flattened, giving them a mushroom-like appearance. This increases the surface area over which the surface of the fastener tips 24 and the expandable metal rear panel 30 interact. This prevents the fasteners 22 from being dislodged from their place in the fastener ports 36 of the expandable metal rear panel 30 and holds the panels 20, 30 together.

The flattening of the fasteners 22 may be produced in a variety of ways, including exposing the fasteners 22 to heat or ultrasound. This causes the tips 24 of the fasteners 22 to melt. As they do so, the fastener tips 24 soften and begin to flow over the outer face of the expandable metal rear panel 30. In this manner, the fastener tips 24 shown in FIGS. 5A and 5B adopt a mushroom-like shape and hold the panels 20, 30 together.

Referring now to FIG. 6B, a cross-sectional view of the inflatable bolster 10 taken at line 6B—6B of FIG. 6A is shown. In this view, the final form of the fasteners 22 of the rigid front panel 20 is visible. As in FIG. 5B, the fasteners 22 are projections of the rigid front panel 20 that extend through the expandable metal rear panel 30. The fastener tips 24 project through ports 36 of the rear panel 30, and are then show flattened over portions of the outer surface of the rear panel 30.

As in FIG. 5B above, FIG. 6B shows the configuration of the expandable rear panel 30. Specifically, the expandable rear panel 30 includes a vertical expansion fold 34. The fold 34 is anchored on both sides to the rigid front panel 20 at the periphery of the expandable panel 30 by fasteners 22. The fasteners 22 hold the expandable rear panel 30 securely to the rigid front panel 20 while allowing the expandable rear panel 30 to inflate in its center region.

FIG. 7A shows a partial rear view of an alternate inflatable hybrid bolster 110 of the invention. The inflatable bolster 110 is similarly composed of a rigid front panel 120 having a decorative front surface 126, and an expandable metal rear panel 130. The inflatable hybrid bolster 110 is assembled using fasteners 122 which, in this variation of the inflatable bolster 10, are screw fasteners 122. The screw fasteners 122 are not formed integrally to one of the two panels 120, 130 of the bolster 110. Instead the screw fasteners 122 may be fasteners known in the art that are inserted through the expandable metal rear panel 130 of the bolster 110, penetrating into the front panel 120. The front panel 120 is thicker than panel 20 of FIGS. 1–6. This change accommodates the use of fasteners 122 projecting outwardly from the rear panel 130 into the front panel 120 while preventing them from exiting the decorative face 126 of the front panel 120.

FIG. 7B shows a cross-sectional view of the inflatable hybrid metal/non-metal bolster 110 taken at line 7B—7B of FIG. 7A. This view shows the projection of the screw fasteners 122 through the expandable metal rear panel 130 into the rigid front panel 120. Specifically, the fasteners 122 project through ports 136 of the rear panel 130 to engage fastener bores 124 present in the rigid front panel 120. In alternate inflatable hybrid bolsters, the screw fasteners 122 are simply driven into the solid material of the front panel 120.

FIG. 7B shows the expandable rear panel 130, including an expansion fold 134. The fold 134 is anchored on both sides to the rigid front panel 120 at the periphery of the expandable panel 130. The screw fasteners 122 hold the expandable real panel 130 securely to the rigid front panel 120 while allowing the expandable rear panel 130 to inflate in its center region.

Figure 8:
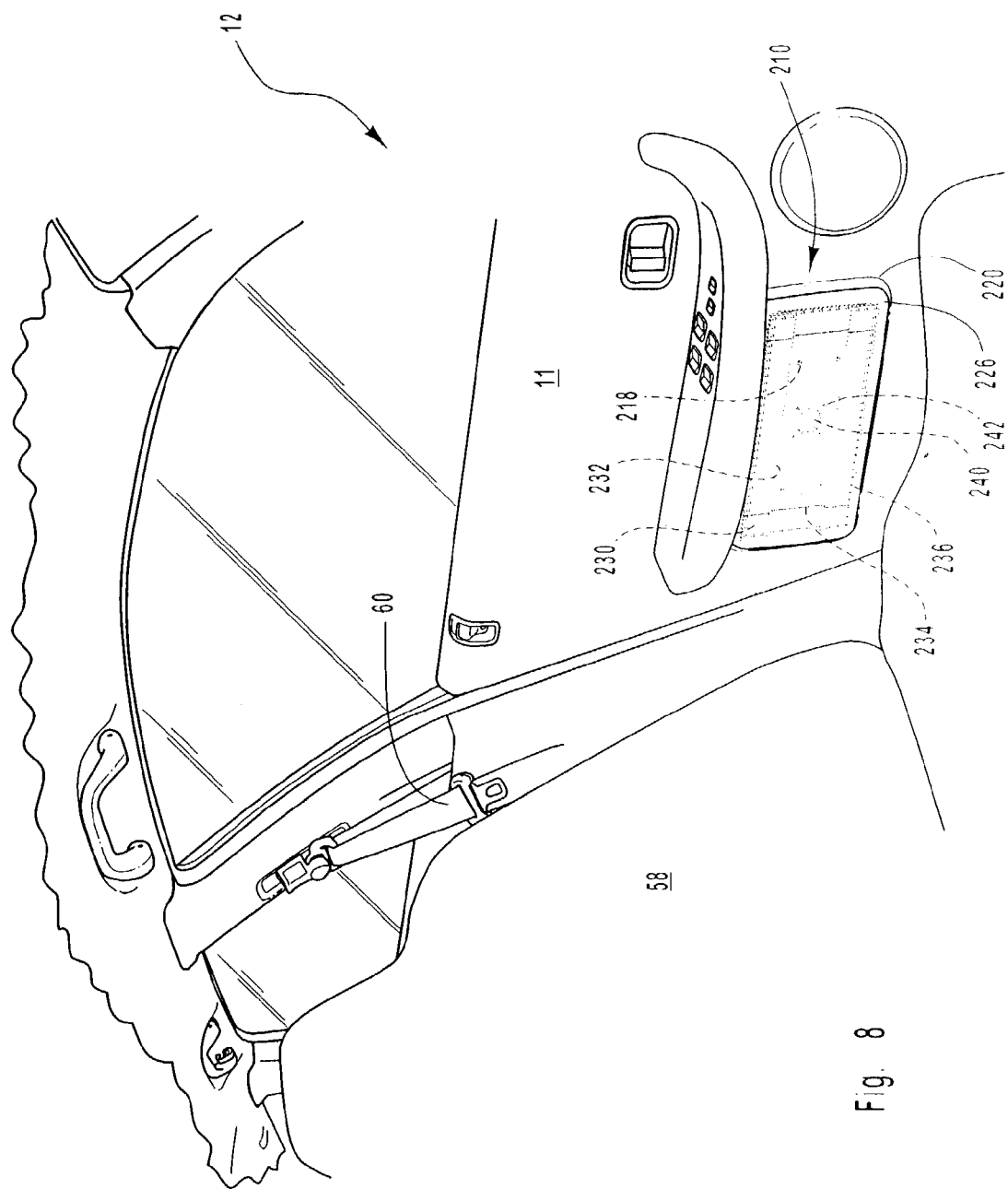
FIG. 8 is a perspective view of a vehicle including an inflatable bolster of the invention used as a pelvic bolster shown mounted in a vehicle.

Referring now to FIG. 8, an alternate embodiment of the inflatable hybrid metal/non-metal bolster 210 of the invention is shown. More specifically, FIG. 8 shows a perspective view of an inflatable bolster 210 of the invention mounted and positioned for use as a pelvic bolster in a vehicle 12. The bolster 210 is placed in a door 11 or alternatively, in a side-panel, of the vehicle 12 such that it may deploy toward a vehicle occupant (not shown) from the side. In the event of a collision, the bolster 210 deploys toward the pelvic region of the vehicle occupant. Once deployed, the bolster can absorb the impact of a vehicle occupant. The bolster 210 thus acts to absorb impact, and may also potentially cooperate with other bolsters and airbags to keep the vehicle occupant positioned for proper deceleration by the primary airbags.

The bolster 210 includes a front panel 220, which functions as the actual bolster contact panel, and an expandable metal rear panel 230, shown in phantom, which expands during deployment to properly place the front panel 220. The front panel 220 may be suitable for use as an interior panel of the vehicle 12, and as such, may have an outer decorative face 226 that may be constructed of materials and of a fashion suitable for use as an interior panel. As such, the front panel 220 may be decorative in nature on its outer face 226. Specifically, the outer decorative face 226 may be contoured, grained, and/or colored to provide a pleasing appearance and feel when used as an interior panel, while retaining its usefulness as a bolster.

The bolster 210 also includes an expandable metal rear panel 230. The expandable metal rear panel 230, shown in FIG. 8 in phantom, is substantially tubular in shape when expanded, and is closed on one end and is attached to the front panel 220 on the other end. The rear panel 230 further includes expansion folds Such as horizontal expansion folds 232 and vertical expansion folds 234. The rear panel 230 is attached to the front panel 220 by fasteners (not shown) projecting from the front panel 220 which travel through fastener ports 236 of the expandable metal rear panel 230. The bolster 210 is attached to a vehicle 12 by fasteners (not shown) placed through bolster attachments 218. The rear panel 230 may further include an inflation orifice 240 through which an inflation gas may be injected to deploy the bolster 210.

The pelvic bolster 210 is configured to inflate upon introduction of a pressurized fluid between the front and rear panels 220, 230 of the bolster 210. This inflation is allowed by the unfolding of the expansion folds 232, 234, and results in the positioning of the substantially rigid front panel 220 near the side of a vehicle occupant (not shown) to protect the occupant during a collision. The expansion folds 232, 234 are generally used in pairs, with pairs of folds being used evenly on opposite sides of the expandable metal rear panel 230. This, in part, configures the bolster 210 to be deployed substantially perpendicularly from its original placement in the vehicle 12. The paired expansion folds 232, 234 are also generally substantially identical in size. This further configures the bolster 210 to be deployed substantially perpendicularly. In alternative embodiments, however, the paired expansion folds 232, 234 may be independently varied in size, number, and shape to affect the manner in which the rigid front panel 220 is deployed. Such variations may be used to deploy the rigid front panel 220 along a curved or angled pathway.

The present invention thus provides an inflatable hybrid metal/non-metal bolster for supporting the knees, lower body, and/or pelvis of a vehicle occupant during a collision. The inflatable bolster is configured to be installed in a vehicle such that it may expand into the path of a body region such as the knees and lower legs or pelvis of a vehicle occupant during a collision event. This includes placement in locations including, under the dashboard of a vehicle, in doors and side panels of a vehicle, as well as in vehicular trim panels.

The inflatable hybrid bolster of the invention generally includes a rigid nonmetal front panel attached to an expandable metal rear panel. The rigid nonmetal front panel of the inflatable bolster is configured to be an interior trim panel for a vehicle, and to be a bolster to a region of a vehicle occupant. This nonmetal front panel may thus be shaped to conform to the contours of the interior of the vehicle. Further, the front panel may be colored, grained, and textured to have an appearance suitable for use in the interior of a vehicle. The bolster function of the front panel may also require specific shaping of the front panel, as well as the use of specific materials.

The inflatable hybrid bolster further includes an expandable metal panel having expansion folds which unfurl when the bolster is inflated. These expansion folds are generally used in pairs to provide the extra material needed for expansion. The rear panel may include both expansion folds which travel along a vertical axis of the rear panel, and expansion folds which travel along a horizontal axis of the rear panel. The expansion folds are generally present in pairs, with matching folds being present on opposite substantially parallel sides of the panel. These paired folds are generally equivalent in size and orientation to each other to configure the bolster to deploy substantially perpendicularly from its original placement.

Both the horizontal and vertical expansion folds may be independently tuned in size, number, and shape. This provides control over the distance through which the inflatable bolster travels when deployed. Specifically, the number or size of pairs of folds may be increased or decreased to vary the deployment distance of the rigid front panel from its original placement. This also dictates the final size of the inflated rear panel. When parallel folds are similar in size, the inflatable bolster deploys substantially perpendicularly to its original placement.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An inflatable bolster comprising:
a substantially rigid plastic front panel; and
an expandable metal rear panel attached to the substantially rigid front panel, wherein the rear panel cooperates with the front panel to define an expandable volume, wherein the expandable metal rear panel is configured to expand in response to the introduction of a pressurized fluid into the volume.

2. The inflatable bolster of claim 1, wherein the substantially rigid front panel comprises a decorative plastic panel.

3. The inflatable bolster of claim 1, wherein the expandable metal rear panel includes expansion pleats to allow expansion of the inflatable bolster.

4. The inflatable bolster of claim 1, wherein the substantially rigid front panel is attached to the expandable metal rear panel by fasteners.

5. The inflatable bolster of claim 4, wherein the fasteners are selected from the group consisting of bolts, screws, and rivets.

6. The inflatable bolster of claim 4, wherein the fasteners comprise projections of the rigid front panel that extend through openings formed in the expandable metal rear panel.

7. The inflatable bolster of claim 6, wherein the projections are flattened after passing through the openings in the expandable metal rear panel to securely attach the substantially rigid front panel to the expandable metal rear panel.

8. The inflatable bolster of claim 7, wherein the projections are flattened by melting them using heat.

9. The inflatable bolster of claim 7, wherein the projections are flattened by melting them using ultrasound.

10. The inflatable bolster of claim 1, further comprising a joint seal positioned between the substantially rigid front panel and the expandable metal rear panel.

11. The inflatable bolster of claim 10, wherein the joint seal is selected from the group consisting of adhesive seals, foam seals, rubber seals, and elastomeric seals.

12. An inflatable knee bolster comprising:
a substantially rigid plastic front panel configured to support the knees and/or lower legs of a vehicle occupant during a collision; and
an expandable metal rear panel securely attached to the substantially rigid front panel, the rear panel comprising expansion folds and an inflation orifice, wherein the rear panel cooperates with the front panel to define an expandable volume, wherein the expandable metal rear panel is configured to expand in response to the introduction of a pressurized fluid into the volume.

13. The inflatable knee bolster of claim 12, wherein the substantially rigid front panel is a decorative panel for use as an interior trim panel of a vehicle.

14. The inflatable knee bolster of claim 12, wherein the expandable metal rear panel is securely attached to the rigid front panel by fasteners.

15. The inflatable knee bolster of claim 14, wherein the fasteners are selected from the group consisting of bolts, screws, and rivets.

16. The inflatable knee bolster of claim 14, wherein the fasteners comprise protrusions of the substantially rigid front panel that extend through openings in the expandable metal rear panel.

17. The inflatable knee bolster of claim 16, wherein the protrusions of the substantially rigid front panel are flattened after passing through the openings of the expandable metal rear panel to securely attach the substantially rigid front panel to the expandable metal rear panel.

18. The inflatable knee bolster of claim 17, wherein the protrusions of the substantially rigid front panel are flattened by melting them using heat.

19. The inflatable knee bolster of claim 17, wherein the protrusions of the substantially rigid front panel are flattened by melting them using ultrasound.

20. The inflatable knee bolster of claim 12, wherein the expandable metal rear panel comprises at least one vertical expansion fold and at least one horizontal expansion fold.

21. The inflatable knee bolster of claim 12, further comprising a joint seal positioned between the substantially rigid front panel and the expandable metal rear panel.

22. The inflatable knee bolster of claim 21, wherein the joint seal is selected from the group consisting of adhesive seals, foam seals, rubber seals, and elastomeric seals.

23. The inflatable knee bolster of claim 12, further comprising a pyrotechnic inflator coupled to the inflation orifice of the expandable metal rear panel.

24. An inflatable pelvic bolster comprising:
a substantially rigid plastic front panel configured to support the pelvis of a vehicle occupant during a collision; and
an expandable metal rear panel securely attached to the substantially rigid front panel, the rear panel comprising expansion folds and an inflation orifice, wherein the rear panel cooperates with the front panel to define an expandable volume, wherein the expandable metal rear panel is configured to expand in response to the introduction of a pressurized fluid into the volume.

25. The inflatable pelvic bolster of claim 24, wherein the substantially rigid front panel is a decorative panel for use as an interior trim panel of a vehicle.

26. The inflatable pelvic bolster of claim 24, wherein the expandable metal rear panel is securely attached to the rigid front panel by fasteners.

27. The inflatable pelvic bolster of claim 26, wherein the fasteners are selected from the group consisting of bolts, screws, and rivets.

28. The inflatable pelvic bolster of claim 26, wherein the fasteners comprise protrusions of the substantially rigid front panel that extend through openings in the expandable metal rear panel.

29. The inflatable pelvic bolster of claim 28, wherein the protrusions of the substantially rigid front panel are flattened after passing through the openings of the expandable metal rear panel to securely attach the substantially rigid front panel to the expandable metal rear panel.

30. The inflatable pelvic bolster of claim 29, wherein the protrusions of the substantially rigid front panel are flattened by melting them using heat.

31. The inflatable pelvic bolster of claim 29, wherein the protrusions of the substantially rigid front panel are flattened by melting them using ultrasound.

32. The inflatable pelvic bolster of claim 24, wherein the expandable metal rear panel comprises at least one vertical expansion fold and at least one horizontal expansion fold.

33. The inflatable pelvic bolster of claim 24, further comprising a joint seal positioned between the substantially rigid front panel and the expandable metal rear panel.

34. The inflatable pelvic bolster of claim 33, wherein the joint seal is selected from the group consisting of adhesive seals, foam seals, rubber seals, and elastomeric seals.

35. The inflatable pelvic bolster of claim 24, further comprising a pyrotechnic inflator coupled to the inflation orifice of the expandable metal rear panel.

36. An inflatable bolster system comprising:
a plastic decorative front panel;
an expandable metal rear panel attached to the plastic decorative front panel, the rear panel including an inflation orifice, at least one vertical expansion fold and at least one horizontal expansion fold; and
an inflator coupled to the inflation orifice; wherein activation of the inflator causes the rear panel to expand
wherein the plastic decorative front panel is attached to the expandable metal rear panel by fasteners and wherein the fasteners extend from the plastic decorative front panel and comprise projections of the plastic decorative front panel that extend through openings formed in the expandable metal rear panel.

37. The inflatable bolster system of claim 36, wherein the plastic decorative front panel is configured to be used as an interior trim panel of a vehicle.

38. The inflatable bolster system of claim 36, wherein the projections are flattened after passing through the openings in the expandable metal rear panel to securely attach the plastic decorative front panel.

39. The inflatable bolster system of claim 36, wherein the projections are flattened by melting them using heat.

40. The inflatable bolster system of claim 36, wherein the projections are flattened by melting them using ultrasound.

41. The inflatable bolster system of claim 36, further comprising a joint seal positioned between the plastic decorative front panel and the expandable metal rear panel.

42. The inflatable bolster system of claim 41, wherein the joint seal is selected from the group consisting of adhesive seals, foam seals, rubber seals, and elastomeric seals.

43. The inflatable bolster system of claim 36, wherein the inflator coupled to the inflation orifice is a pyrotechnic inflator.

44. The inflatable bolster system of claim 36, wherein the plastic decorative front panel is shaped for use as a knee bolster.

45. The inflatable bolster system of claim 36, wherein the plastic decorative front panel is shaped for use as a pelvic bolster.

* * * * *